R. C. NEWHOUSE.
PROCESS OF MAKING CEMENT.
APPLICATION FILED AUG. 31, 1914.
1,184,656.
Patented May 23, 1916.
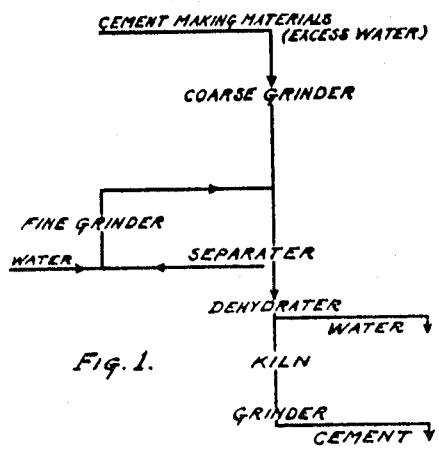
Fig. 1.
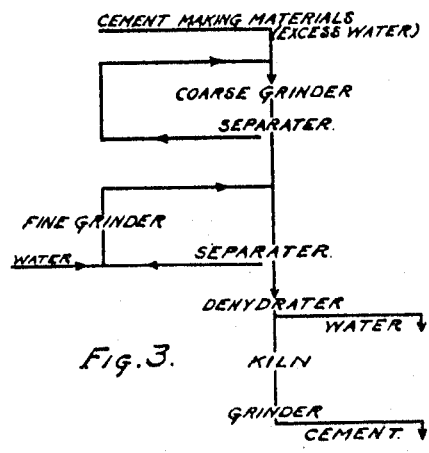
Fig. 3.
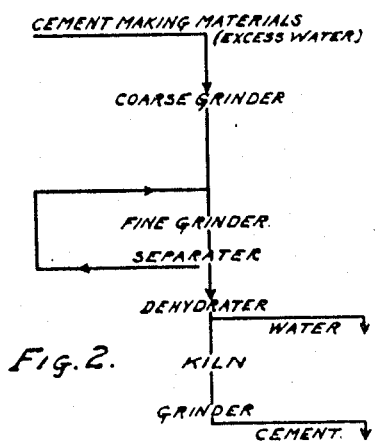
Fig. 2.
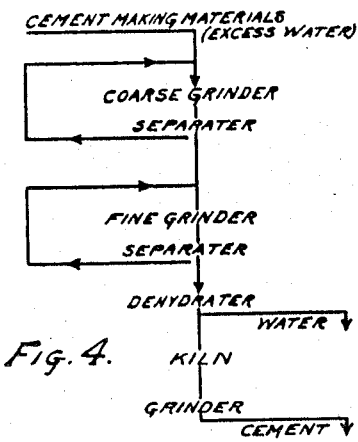
Fig. 4.
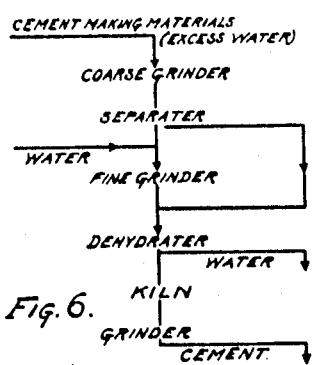
Fig. 6.
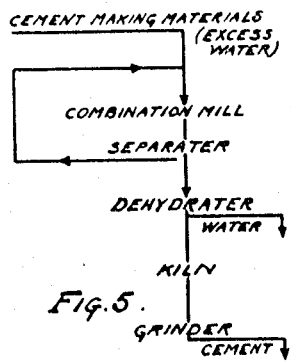
Fig. 5.
Fig. 7.
WITNESSES:
INVENTOR —
R. C. Newhouse
BY
ATTORNEY.

UNITED STATES PATENT OFFICE.

RAY C. NEWHOUSE, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

PROCESS OF MAKING CEMENT.

1,184,656.  Specification of Letters Patent.  Patented May 23, 1916.

Application filed August 31, 1914. Serial No. 859,929.

*To all whom it may concern:*

Be it known that I, RAY C. NEWHOUSE, a citizen of the United States, residing at Milwaukee, in the county of Milwaukee and State of Wisconsin, have invented a certain new and useful Improvement in Processes of Making Cement, of which the following is a specification.

This invention generally relates to processes of making cement, particularly Portland cement, the preparation of which involves grinding prior to burning.

In the manufacture of Portland cement the most usual process heretofore has been the dry process, in which the cement making materials are ground dry, burnt and then reground into cement.

Another process in use, but not so largely, is the wet process, in which the material is ground wet by insuring the presence of water sufficient to form a slurry. This is done either by adding water to the cement forming materials or in permitting the same to remain therein when preliminarily present as in the case of marl. After grinding in the form of slurry, the cement making materials are fed in their moist condition to the kiln and the moisture is first evaporated directly therein and then the materials are burnt to clinker after which they are ground direct to cement.

Tube mills are generally used for fine grinding and it is necessary in such mills to so regulate and restrict the feed thereto, that the product is within the prescribed limits of fineness required. These limits of fineness of the cement making materials preliminary to burning are defined by the limiting requirements of the kiln, these being that the particles of material must not be so coarse as to require too much time in fusing by the available heat, otherwise they will pass through the kiln unburnt. If the required time be allowed, then the heat to which the materials are subjected would be so great as to form clinker much harder to grind. Too much coarse material could not therefore be permitted to pass from the tube mill with the predominant fine material, necessitating restriction of the feed to the tube mill as stated. If the cement making materials fed to the kiln are of uniformly fine grade, it follows that the product may be passed through the kiln at a greater rate than if the materials were finer and coarser than that grade, and that the finer this uniform product, the less time will be required to burn the same to clinker.

The capacity of a tube mill is reduced about 50 per cent. in order to vary the fineness of the product from 90 per cent. passing a 100 mesh screen, to 95 per cent. passing such a screen. The efficiency of a tube mill will therefore be greatly increased by separating the oversize from its product and returning same to be reground. No restriction of the regulation of the feed to the tube mill will then be necessary. The efficiency of a tube mill will also be greatly increased by separating from the feed thereto, material made fine enough for the kiln in the preliminary grinder.

Separating finely ground product is a difficult matter. For instance, either wet or dry material may be easily separated in a 20 mesh screen, but this becomes impracticable when the material is to be separated by a screen of from 100 to 200 mesh.

The separating out of material above 200 mesh is much more desirable on the raw side of the mill in order to attain a more perfect fusion or burning in the kiln. There is no advantage in having a large proportion of 500 mesh material if it contains much that is coarser than 100 mesh. This is because the burning of this material, which must be completely effected, will be that required for the coarse material so that all of the fine material must be subjected to the heat required for the coarse. If the coarse had been separated out, less heat would have been necessary to completely burn the remaining fine material. This is not true on the clinker grinding side of the mill where it is only necessary in order to give value to the cement, that its sand-carrying capacity may be large, that is, that there be a maximum number of particles present. It is not objectionable here that some of these particles are comparatively large.

The object of this invention is therefore to secure more efficient production of cement. The attainment of this object is brought about mainly by the separation of the cement making materials before entering the fine grinder or tube mill, making it unnecessary to load the tube mill with material already fine enough; also by the separation of the cement forming materials on emerging from the fine grinder or tube mill, sending back the oversize to be reground, making it possible to feed to the mill at a greater rate. The separations referred to are preferably made hydraulically, for instance by means of classifiers. In this way an excess of water is present and for this reason the object of the invention is secondarily brought about thereby increasing the efficiency of the fine grinder.

In the wet process of making cement, referred to hereinabove, the water which was present or added to form a slurry was only sufficient for that purpose, that is to give the material a consistency making it possible to feed same. This was as much sometimes as 50 per cent., and while with crystalline rocks it ran as low as 35 per cent., yet it was mainly a more expensive process than the dry process because of the presence of this excessive water, because more fuel had to be used in order to evaporate this moisture. No attempt whatever was made to reduce the moisture content of the tube mill product before passing same to the kiln.

The specific objects of this invention are,—to avoid passing through the fine grinder, the fines from the preliminary grinder, by preliminarily separating. To increase the capacity of the fine grinder by increasing the feed to a maximum, the oversize being separated and returned. To maintain the presence of sufficient water for greatest grinding capacity. To reduce to a minimum the water content of the slurry before passing to the kiln. To increase the kiln capacity by feeding thereto a more uniform size of cement making material. To save fuel. These and other objects will be apparent from the disclosure in the accompanying specification and drawing illustrating modifications of this invention.

The figures of the drawing schematically illustrate the steps of modified processes, the subject of this invention.

Referring particularly to Fig. 1, cement making materials are fed with excess of water to any form of coarse grinder, the product of which is then sent to a closed circuit including a separator and a fine grinder. The introduction of the product into the circuit is directly following the fine grinding step, so that the product from the coarse grinder mixes with that from the fine grinder, the mixture passing to the separator which preferably is a classifier. The oversize removed by the separator passes along the closed circuit to the fine grinder, water being added thereto. The fines come from the separator in a wet condition and pass to a dehydrater such as a settling tank, whereby water is removed. The thickened product from the dehydrater is then passed to a kiln wherein it is burnt to clinker. The clinker then passes to the grinder wherein it is ground to cement.

It will be observed that in both the coarse and the fine grinder there is sufficient water present for maximum capacity grinding conditions. It will also be observed that the separator removes the fines produced in the coarse grinder before passing to the fine grinder. It will also be observed that the fine grinder may be operated to fullest capacity because the oversize therefrom is returned thereto by the separator to be reground. It will also be observed that the fines from the fine grinder are dehydrated before passing to the kiln. All of these features assist in operating the machinery at its fullest capacity and with least wear and fuel required in burning the cement making materials to clinker.

Referring to the modification shown in Fig. 2, this is in all respects the same as that of Fig. 1 with two exceptions; first, that the product from the coarse grinder enters the closed circuit preceding the fine grinding step, rather than following same; and second, no water is introduced preceding the fine grinding step because the material from the coarse grinder has sufficient water therein.

The modification shown in Fig. 1 is generally preferable over that shown in Fig. 2 because the fine material from the coarse grinder need not pass through the fine grinder.

Referring to the modification shown in Fig. 3, this is the same in all respects as that shown in Fig. 1, with the exception that a preliminary separator is introduced following the coarse grinder, the oversize being returned to the coarse grinder and thus forming a preliminary closed circuit including a coarse grinder and a separator.

Referring to the modification shown in Fig. 4, this is in all respects similar to that of Fig. 2, with the exception that it includes the same conditions as is present in the modification of Fig. 3 over that of Fig. 1.

The addition of the separator following the coarse grinder in the modifications shown in Figs. 3 and 4, is for the purpose of assigning to the coarse grinder some of the work of grinding that would otherwise be performed in the fine grinder.

Referring to the modification shown in Fig. 5, the coarse grinding step and the fine grinding step are combined in a single mill. This is therefore much like the modification shown in Fig. 2, eliminating the coarse grinder and doing this work, as well as the fine grinding, in the one mill.

Referring to the modification shown in Fig. 6, this is like the modification shown in Fig. 1, except that the product of the fine grinder is passed on to the dehydrater instead of being sent back to the separator. In other words, the product from the fine grinding step is not separated.

The modification shown in Fig. 7 is similar to that of Fig. 6, except for the location of the dehydrater. Here the dehydrater serves to remove the water from the fines separated out by the classifier only, instead of as in Fig. 6 removing the water from the combined product of the fine grinder and the fines separated out.

The advantage of the modification shown in Fig. 7 over that shown in Fig. 6 is in requiring a minimum of dehydrating machinery.

The advantage of the modifications shown in Figs. 6 and 7 is that the separator handles the material but once.

It should be understood that it is not desired to be limited to the exact details of the process disclosed, for obvious modifications will occur to a person skilled in the art.

It is claimed and desired to secure by Letters Patent,—

1. The process of making cement comprising, grinding cement forming materials with excess of water present, removing water from the ground material, directly burning and grinding.

2. The process of making cement comprising, grinding cement forming materials with excess of water present, separating out the fines, grinding the oversize, removing water from the fines, directly burning and grinding, the material of said oversize being added to said materials prior to burning.

3. The process of making cement comprising, grinding cement forming materials with excess of water present, separating out the fines, grinding the oversize, removing water from the fines, directly burning and grinding, the material of said oversize being added to said materials prior to separating.

4. The process of making cement comprising, grinding cement forming materials with excess of water present, adding other cement forming materials to the ground product, separating out the fines from the combined materials, grinding the oversize to form said other cement forming materials, removing water from the fines, directly burning and grinding.

5. The process of making cement comprising, coarse grinding cement forming materials with excess of water present, separating out the fines, adding the oversize to the said cement forming materials to be ground therewith, subjecting the separated fines to a series of steps comprising, separating out the fines, grinding the oversize with excess of water present, removing water from the fines, burning and grinding, the material of said second oversize being added to said fines first separated.

6. The process of making cement comprising, coarse grinding cement forming materials with excess of water present, separating out the fines, adding the oversize, to the said cement forming materials to be ground therewith, adding ground material to the separated fines, separating out the fines from the combined materials, returning and grinding the oversize to form the ground material added, removing water from the fines, burning and grinding.

In testimony whereof, the signature of the inventor is affixed hereto in the presence of two witnesses.

RAY C. NEWHOUSE.

Witnesses:
G. F. DE WEIN,
N. M. GUMAER.